(12) United States Patent
Gilbert et al.

(10) Patent No.: US 7,889,094 B2
(45) Date of Patent: Feb. 15, 2011

(54) UTILITY NETWORK INTERFACE DEVICE WITH VISUAL INDICATION OF NETWORK CONNECTIVITY

(75) Inventors: Brad Gilbert, Burlingame, CA (US); Raj Vaswani, Portola Valley, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 301 days.

(21) Appl. No.: 12/139,413

(22) Filed: Jun. 13, 2008

(65) Prior Publication Data
US 2009/0309749 A1 Dec. 17, 2009

(51) Int. Cl.
*G08B 5/22* (2006.01)
(52) U.S. Cl. .............. 340/815.45; 340/426.13; 340/815.66
(58) Field of Classification Search ........... 340/815.45, 340/815.47, 815.53, 815.55, 815.56, 815.6, 340/815.65, 815.66, 426.13
See application file for complete search history.

(56) References Cited

U.S. PATENT DOCUMENTS

| | | | |
|---|---|---|---|
| 5,155,441 A * | 10/1992 | Zelm ......................... 324/551 |
| 5,202,914 A * | 4/1993 | Kim et al. .............. 379/106.03 |
| 6,362,745 B1 | 3/2002 | Davis | |
| 6,738,693 B2 * | 5/2004 | Anderson ................... 700/291 |
| 7,379,791 B2 * | 5/2008 | Tamarkin et al. ............ 700/286 |
| 7,548,223 B2 * | 6/2009 | Brooksby et al. ............. 345/87 |
| 2006/0103549 A1 | 5/2006 | Hunt et al. | |
| 2008/0088475 A1* | 4/2008 | Martin ................... 340/870.02 |
| 2009/0024858 A1* | 1/2009 | Hijazi et al. ................. 713/323 |

OTHER PUBLICATIONS

International Search Report and Written Opinion issued in PCT/US2009/003442 dated Oct. 19, 2009.
Product Manual v4. 2A: XStream-PKG-E Ethernet RF Modem, dated Oct. 27, 2004, retrieved from the Internet: URL:http://www.bb-elec.com/bb-elec/literature/manuals/Maxstream/Xstream-PKG_Ethernet-RF-Modem.pdf#6>.

* cited by examiner

*Primary Examiner*—Daniel Previl
(74) *Attorney, Agent, or Firm*—Buchanan Ingersoll & Rooney PC

(57) ABSTRACT

A network interface device includes a transceiver capable of connecting a utility meter to a wireless network, and a visual indicator capable of displaying a status of a connection between the utility meter and the wireless network. The visual indicator can be an LED, whose display state indicates the status of network connectivity. Alternatively, the visual indicator can be an integrated digital display of the meter that is typically used to indicate a metering parameter, such as total consumption or rate of consumption.

23 Claims, 7 Drawing Sheets

UTILITY NETWORK INTERFACE DEVICE WITH VISUAL INDICATION OF NETWORK CONNECTIVITY

FIELD OF THE INVENTION

The present invention relates to a network interface device for connection of a utility meter to an AMR/AMI network of a utility, e.g. an electric power provider. In particular, the present invention relates to a network interface device capable of providing a visual indication of network connectivity.

BACKGROUND

Automated Meter Reading (AMR) systems, including handheld, mobile and network technologies for automatically collecting data from utility meters, efficiently and accurately collect metering data compared to manual meter reading. Advanced Metering Infrastructure (AMI) networks employing AMR technology collect additional types of data, such as interval data or logging of meter events. The additional data is used for a variety of purposes, e.g., usage profiling, time of use billing, demand forecasting, demand response, rate of flow recording, leak detection, flow monitoring, conservation enforcement, or remote shutoff.

In an AMR/AMI network, the utility meters are fully electronic with data reading, data storing, and digital packet communications capabilities. The utility meters are all linked together in a wireless LAN configuration. In this configuration, each utility meter is a network node. Each node can communicate with other nodes directly and with the utility via access points. Some nodes may be able to communicate with more than one access point. The access points act as an "agent" for the nodes in the wireless network, and transfer messages between themselves, other nodes and the utility. Similarly, the utility communicates with the nodes in the wireless LAN via the access points. Access points can be passive bridges or active data routers/forwarders, depending on the type of network devices deployed and the applications. An example of an AMR/AMI network and method of connecting thereto is found in co-pending U.S. patent application Ser. No. 11/732,964, which is incorporated herein by reference in its entirety.

When a utility meter, along with its network interface device, is added to an AMR/AMI network, the installer needs to know that the utility meter is installed correctly, operating properly, and communicating with the network, prior to the installer leaving the site. Additionally, the installation can be performed more efficiently if no tools or other devices are needed to determine the status of the utility meter.

SUMMARY

A network interface device includes a transceiver capable of connecting a utility meter to a wireless network, and a visual indicator capable of displaying a status of a connection between the utility meter and the wireless network. In one exemplary embodiment, the visual indicator can be an LED or the like, whose display state indicates the status of network connectivity. In another exemplary embodiment, the visual indicator can be an integrated digital display of the meter that is typically used to indicate a metering parameter, such as total consumption or rate of consumption.

DETAILED DESCRIPTION OF THE ILLUSTRATED EMBODIMENTS

FIGS. 1a-d illustrate an AMR/AMI network in which the principles of the invention can be implemented. The network employs one or more access points, e.g. gateways, connected to a utility. These connections are provided by a Wide Area Network (WAN), and may be wireless or wired. Each access point also connects directly or indirectly with one or more utility meters via a wireless Local Area Network (wireless LAN). The utility meters communicate with each other and with the access points via the wireless LAN, to continuously keep track of the best pathways for connection to the access points.

Figure 1A:
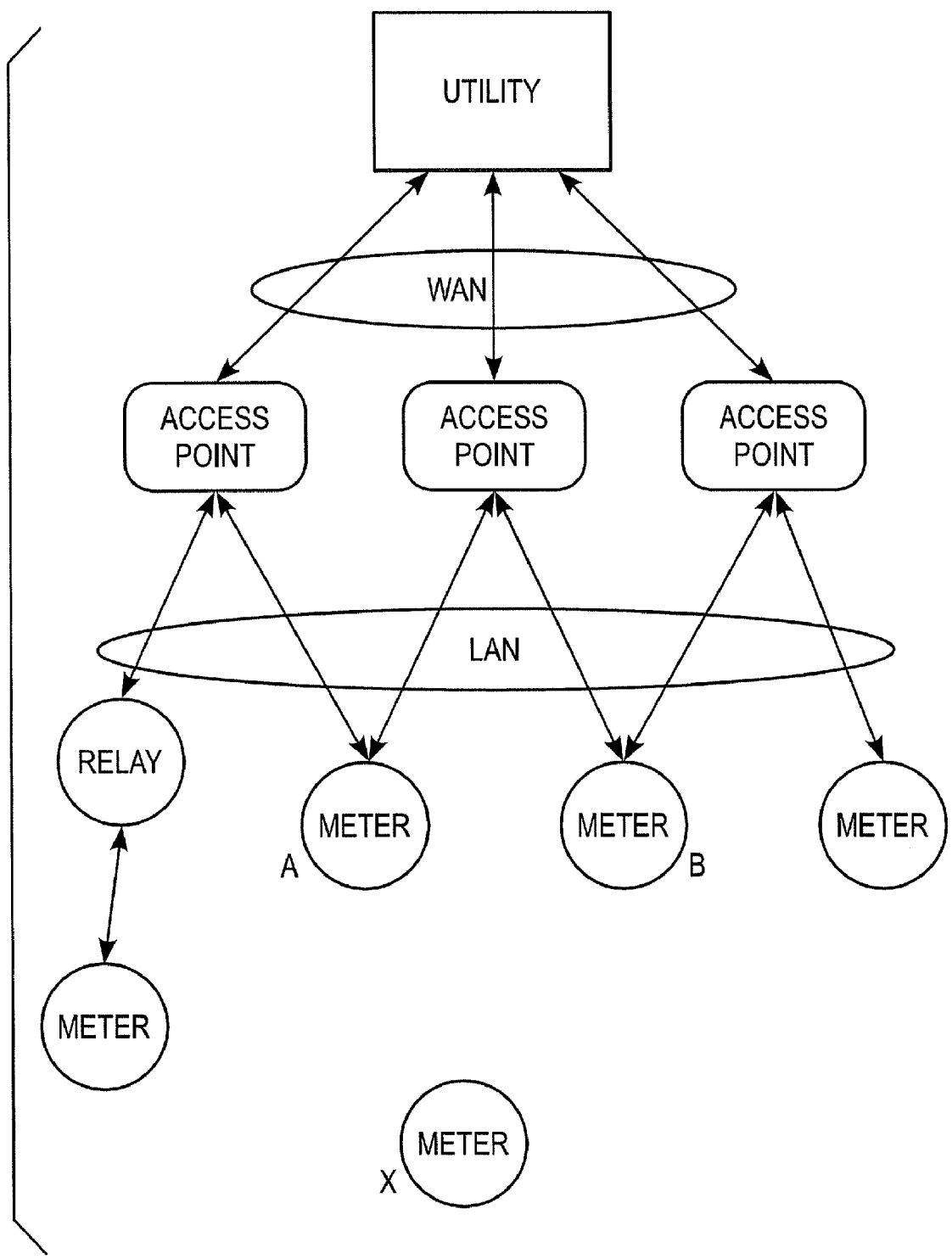
FIGS. 1a-1d are schematic views of an AMR/AMI network.
Figure 1B:
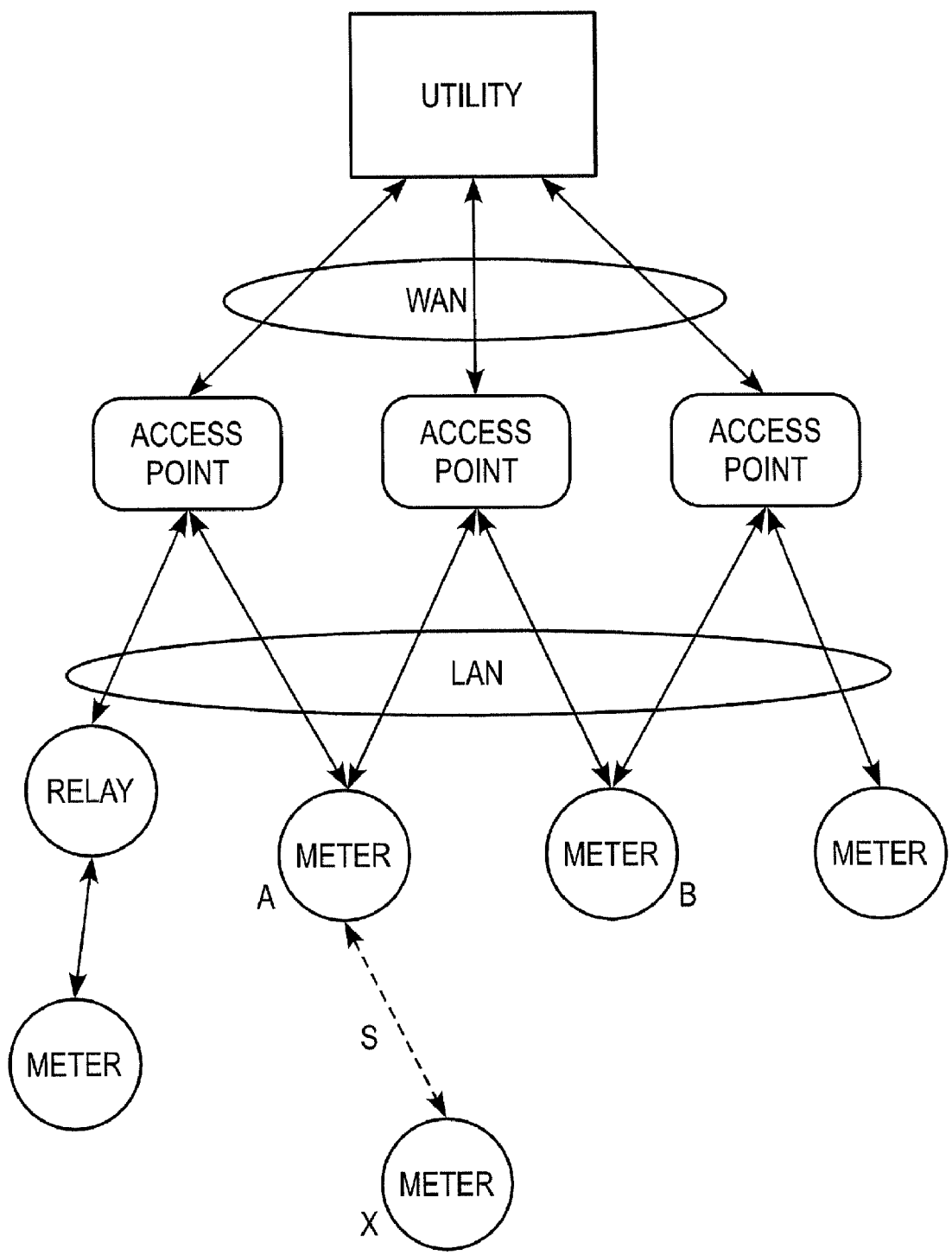
Figure 1C:
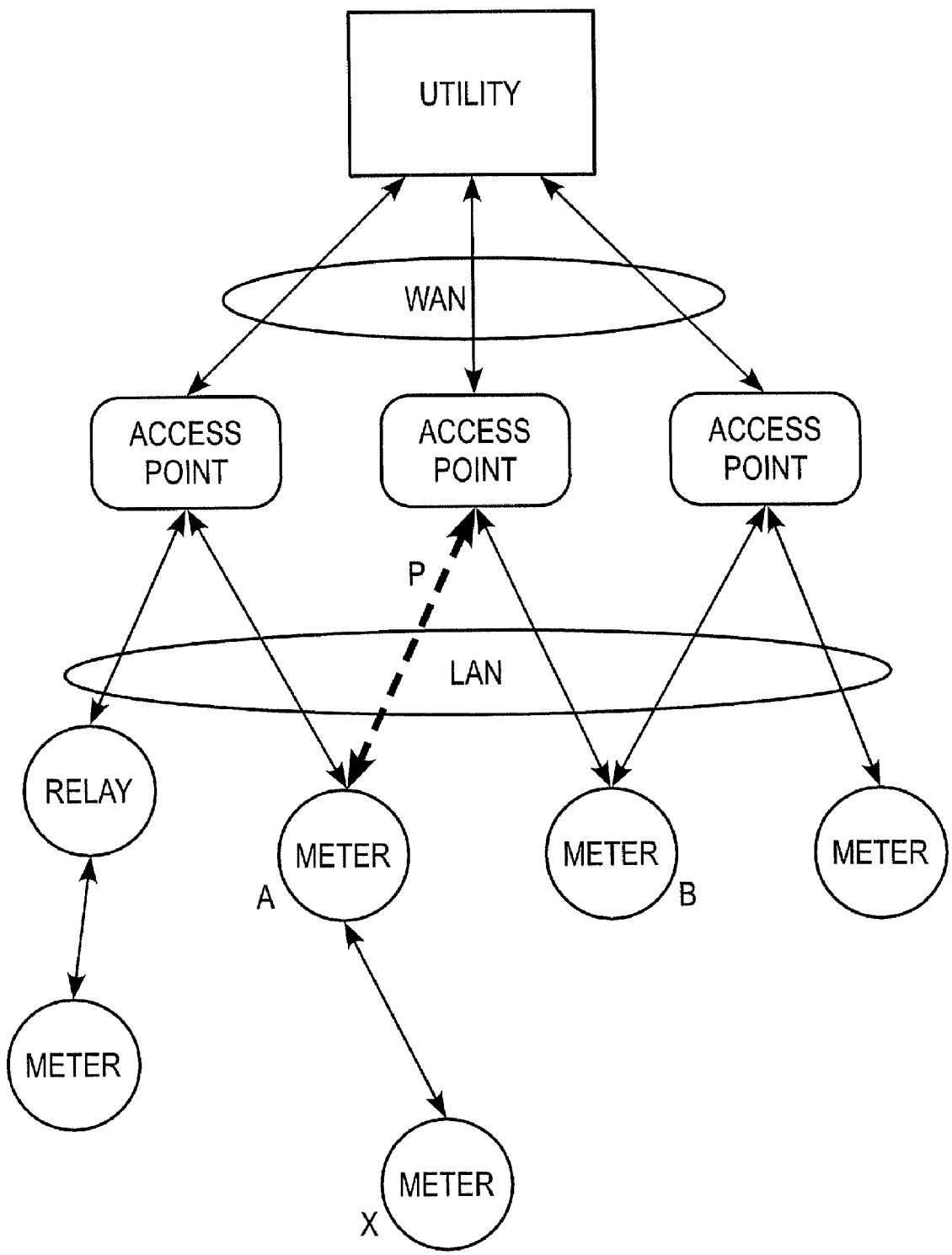
Figure 1D:
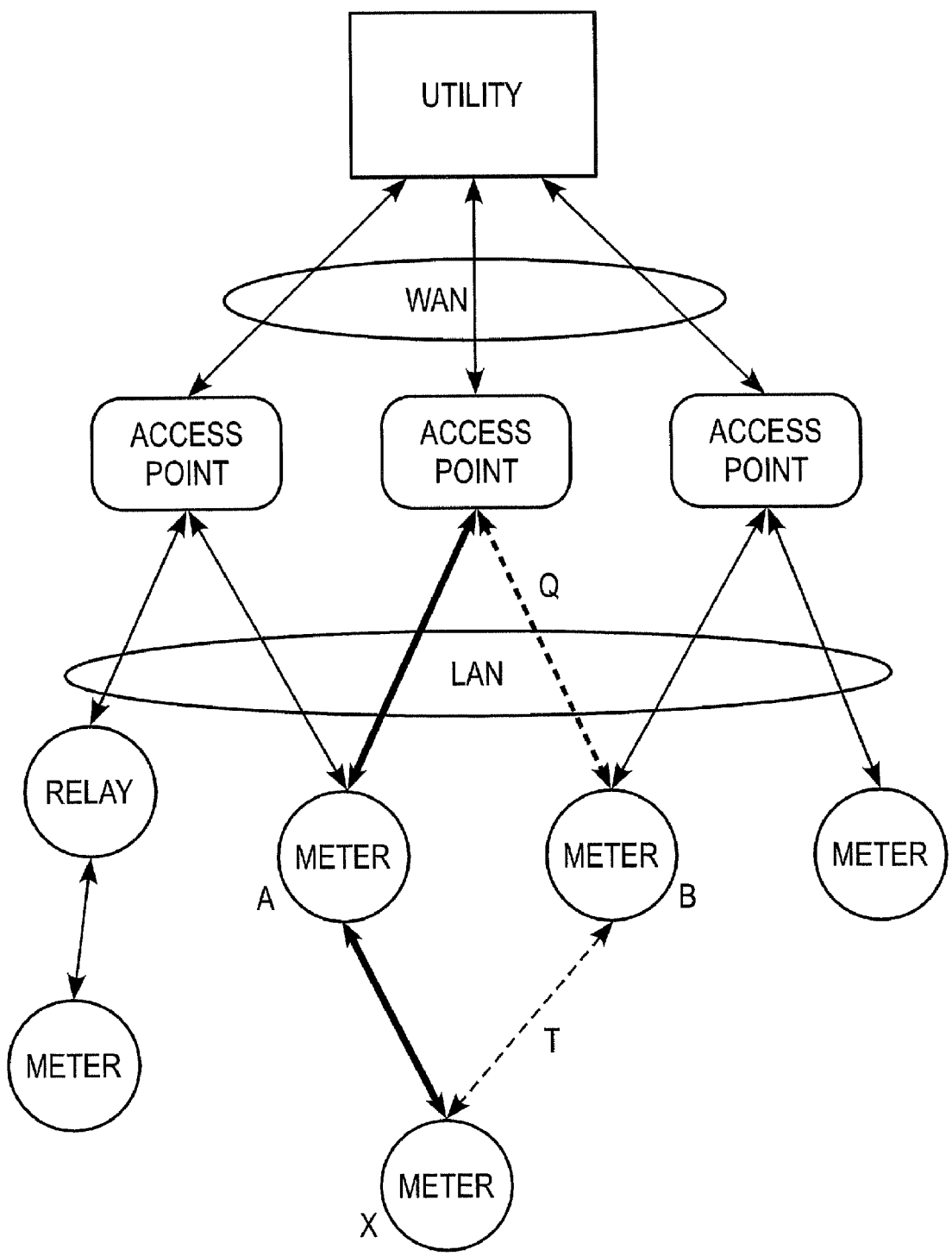

FIGS. 1a-1d depict the various stages in the connection of a meter to the network. In FIG. 1a, a new meter X has been installed on or in a premises, but is not yet connected to the network. When a utility meter is to be added as a new node in a wireless LAN for connection with an AMR/AMI network, the utility meter is powered up. At this time, a network discovery process begins. Referring to FIG. 1b, the utility meter begins to search for neighbor nodes, i.e., existing nodes within its range of communication, as depicted by the dashed line S. A neighbor node can be another utility meter, a relay, or an access point. In the stage illustrated in FIG. 1c, the meter X has acquired a neighbor node A, i.e. the two nodes have established communication and registered with one another. At this point, the utility meter X establishes one or more routes to an access point, depicted by the bold dashed line P. At the stage illustrated in FIG. 1d, the meter X has established a route to an access point, via the meter node A, and continues to acquire other neighbor nodes, e.g. meter node B, and establish alternative routes to the access point, as shown by the dashed lines T and Q. If the utility meter does not establish a route within a predetermined time frame, the connection process times out. The node may then have to restart the discovery and registration process again. In some embodiments, the node may request the help of an access point in locating a route to the access point.

Figure 2:
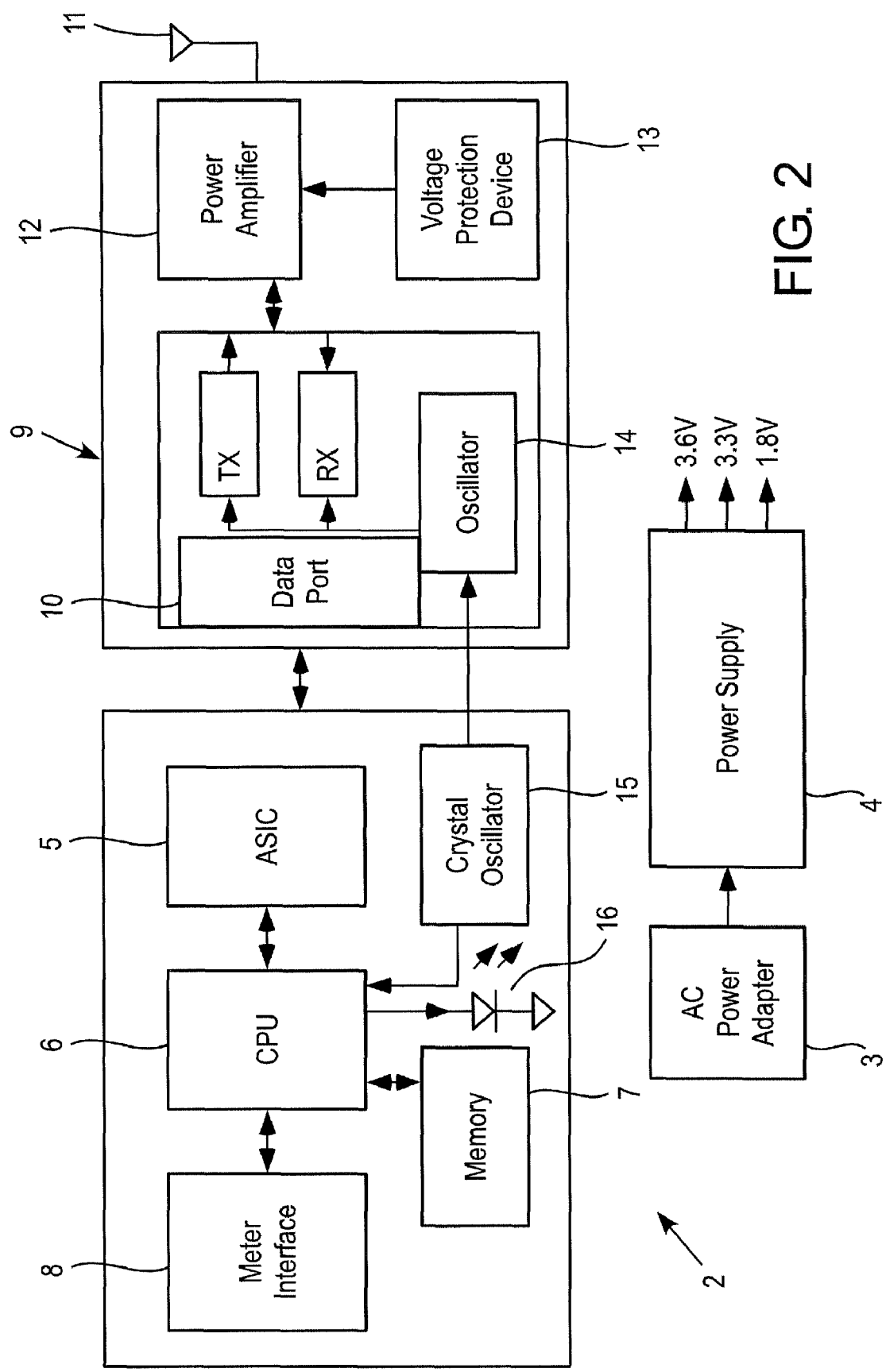
FIG. 2 is a schematic view of a NIC according to an embodiment of the invention.

To enable the meters to communicate via the wireless LAN, each utility meter of the AMR/AMI network is provided with a network interface card (NIC) 2. A NIC 2 comprising a single printed circuit card is schematically illustrated in FIG. 2. The NIC 2 includes an AC power adapter 3 and a power supply 4. The AC power adapter 3 connects an external power source to the power supply 4 in order to provide an input voltage to the power supply 4. The power supply 4 converts the input voltage to various output voltages for the various powered components of the NIC 2. Alternatively or as a backup, the input voltage for the power supply 4 can be provided by a battery provided on the NIC 2.

An Application-Specific Integrated Circuit (ASIC) 5 of the NIC 2 is encoded to control the components of the NIC 2 via a Central Processing Unit (CPU) 6 and a memory 7. The CPU 6 can be an ARM 7 processor, for example. A meter interface 8 of the NIC 2 is operatively connected to the CPU 6 and receives usage and other data from the utility meter. In some embodiments, the meter interface 8 can also send information to the utility meter as needed, e.g., a command to shut off power to the building or premises associated with the meter.

A transceiver 9 is provided on the NIC 2 for communicating wirelessly with the AMR/AMI network. The transceiver 9 includes a data port 10 for providing a two-way data connection between the transceiver 9 and the CPU 6. Similarly, an antenna 11 provides a two-way data connection between the transceiver 9 and the AMR/AMI network. A power amplifier 12 drives the antenna 11 and is surge protected by a voltage protection device 13. An oscillator 14 generates a suitable carrier frequency for the power amplifier 12, e.g. 1.8 Ghz. A crystal oscillator 15 generates an appropriate frequency, e.g. 9.2 Mhz, which provides a stable clock signal to the CPU 6 and the ASIC 5, and also stabilizes the carrier frequency of the oscillator 14. When the meter and NIC are powered up, the CPU 6 controls the transceiver 9, by way of commands received from the ASIC 5, to progress through the various stages of network connection described previously, to thereby establish the meter as a functioning node in the network.

In the illustrated embodiment, an LED 16 is provided on the NIC 2 and operatively connected to the CPU 6, to indicate the status of the utility meter and the NIC 2 during an attempted connection of the utility meter with the AMR/AMI network. In one embodiment, a single color LED can be used. In this case, the CPU 6 can communicate the various states of connectivity by controlling the LED 16 to vary its flash pattern. Alternatively, a multi-color LED, such as a tri-color LED, can be used, and selectively controlled by the CPU 6. Table 1 illustrates exemplary flash patterns and colors for respective implementations utilizing a single color LED and a tri-color LED.

TABLE 1

| Status | Single Color LED | Tri-Color LED |
| --- | --- | --- |
| Meter is powered, network discovery is enabled and the NIC is not connected to the network | On, Continuously | Green, Continuous |
| Meter is powered and network discovery is disabled | On, On, Off Sequence | Red, Continuous |
| Meter is acquiring its first neighbor node | Fast Flash | Green, Fast Flash |
| Meter has acquired a neighbor node and is acquiring one or more routes to the network access point. | Slow Flash | Green, Slow Flash |
| Meter is powered and has established one or more routes to the network access point. | Off | Blue |
| Meter LED indicator duration timed out | Off | Off |
| Meter has attempted connecting to the network, but has not for a defined duration. | Off | Off |

Figure 3:
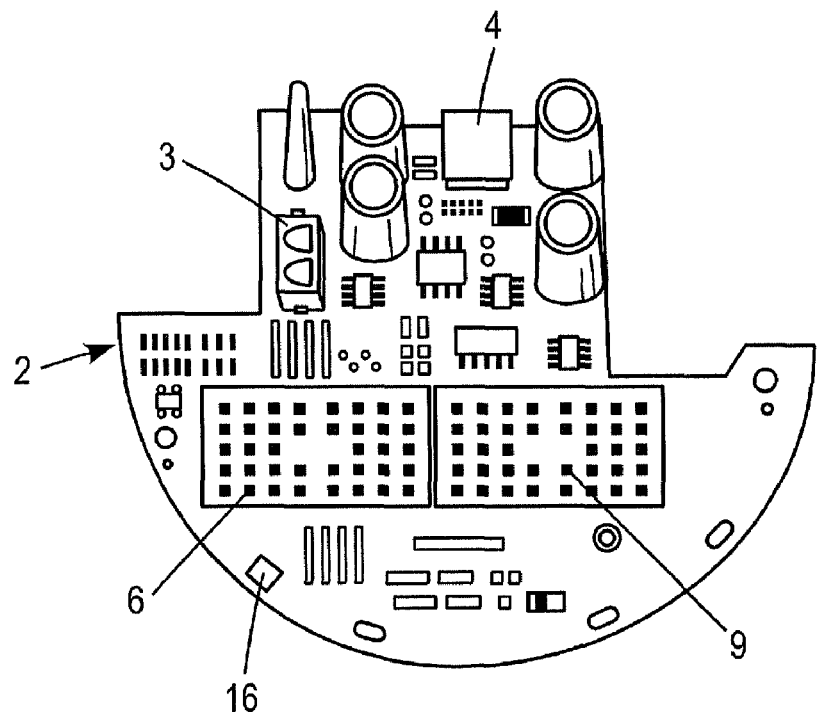
FIG. 3 is a front perspective view of a NIC according to an embodiment of the invention.
Figure 4:
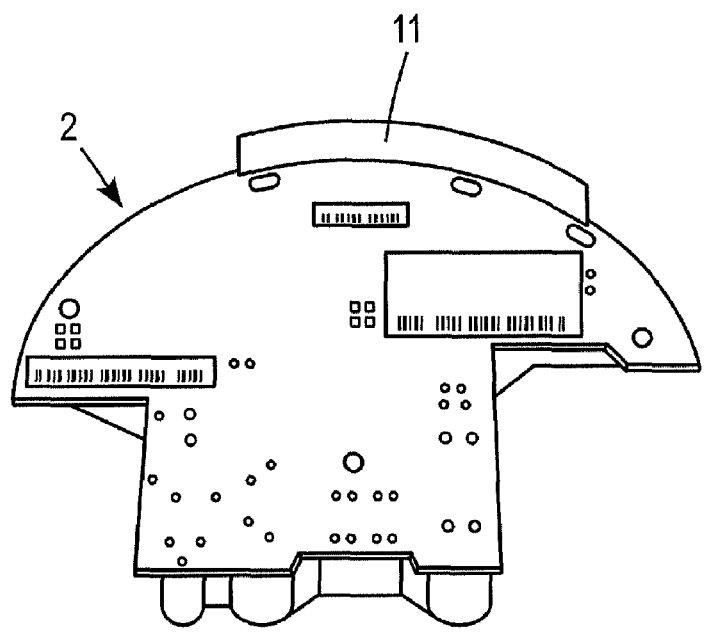
FIG. 4 is a rear perspective of a NIC according to an embodiment of the invention.

FIGS. 3 and 4 depict front and back views of one implementation of a NIC 2. As best seen in FIG. 4, the antenna 11 is positioned on the outer edge of the NIC 2 for optimal communication with the AMR/AMI network. As best seen in FIG. 3, the LED 16 is positioned along an outer edge of the NIC 2. This ensures that the LED 16 is visible for various designs of utility meters in which the NIC 2 may be installed.

Figure 5:
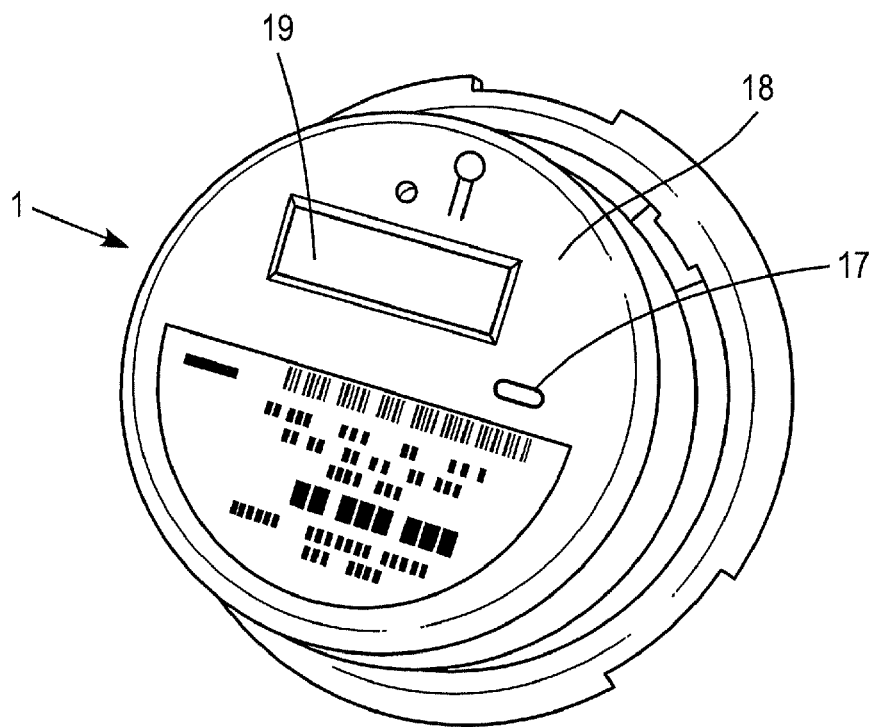
FIG. 5 is a front perspective view of a utility meter according to an embodiment of the invention.
Figure 6:
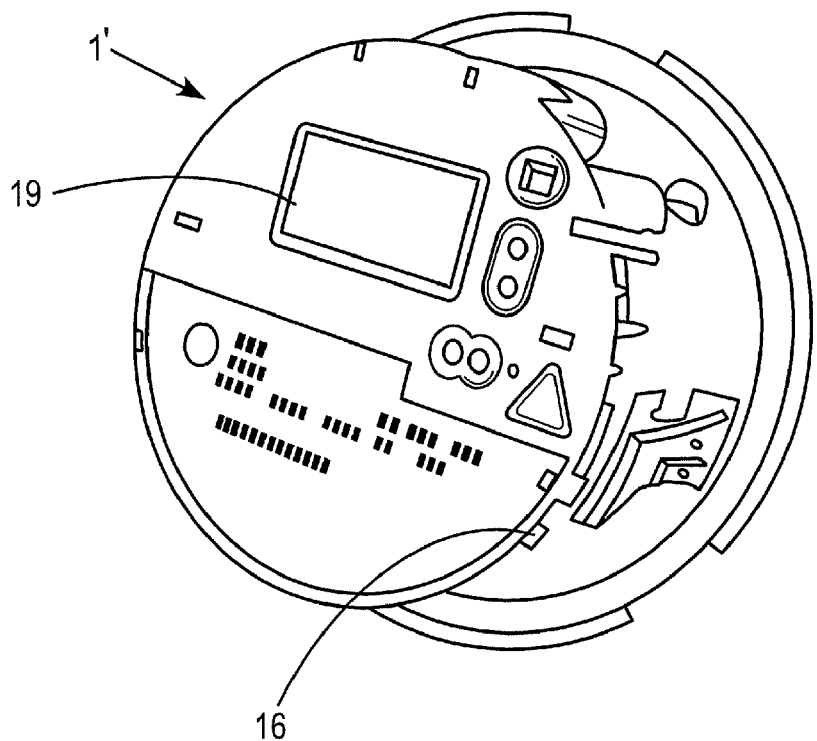
FIG. 6 is a front perspective view of a utility meter according to another embodiment of the invention.

For example, for a closed case utility meter 1 as depicted in FIG. 5, the LED 16 is visible through a window 17 in the front of the case 18. For an open case utility meter 1' as illustrated in FIG. 6, the LED 16 is visible at the side of the utility meter 1'.

Typically, an electronic meter includes a digital display 19 that provides information about a measured parameter of the commodity being metered, e.g. total consumption and/or rate of consumption of electricity, gas, water, etc. In accordance with another embodiment of the invention, the display 19 can be employed to indicate the current status of the network connection process. This indication can be in addition to, or an alternative to, the indication provided by the LED 16. In this embodiment, the CPU 6 communicates with the meter via the meter interface 8, and instructs the meter to present numeric codes or characters on the display 19, which indicate the respective states of connectivity of the NIC 2 to the network.

The invention has been described in detail with particular reference to preferred embodiments thereof, but it will be understood that variations and modifications can be effected without departing from the spirit and scope of the invention.

What is claimed is:

1. A network interface device, comprising
   a transceiver capable of connecting a utility meter to a wireless network by progressing through a plurality of different states of connectivity until establishing the utility meter as a functioning node in the network; and
   an indicator that operates to visually display an indicator of each of the plurality of different states of connectivity between the utility meter and the wireless network as the utility meter progresses through the plurality of different states of connectivity.

2. The network interface device of claim 1, wherein the indicator comprises an LED.

3. The network interface device of claim 2, wherein the LED comprises a single-color LED.

4. The network interface device of claim 2, wherein the LED comprises a tri-color LED.

5. The network interface device of claim 2, wherein the network interface device is a network interface card, and wherein the LED is positioned on an outer edge of the card.

6. The network interface device of claim 1, wherein the indicator comprises circuitry for controlling a digital display of the utility meter to display the different states.

7. The network interface device of claim 1, wherein
   the plurality of different states of connectivity include a first state of connectivity in which the utility meter is acquiring a neighbor node, a second state in which the neighbor node has been acquired, and a third state in which a route from the utility meter to a network access point has been established; and
   the indicator operates to display
      a first indication, to indicate that the utility meter is in the first state of connectivity, of acquiring a neighbor node;
      a second indication, to indicate that the utility node is in the second state of connectivity, in which the neighbor node has been acquired; and
      a third indication, to indicate that the utility meter is in the third state of connectivity, in which the route from the utility meter to the access point has been established.

8. The network interface device of claim 1, wherein
   the plurality of different states of connectivity include a first state of connectivity in which the utility meter is acquiring a neighbor node, and a second state of connectivity in which the neighbor node has been acquired; and the indicator operates to display
a first indication, to indicate that the utility meter is in the first state of connectivity, of acquiring a neighbor node; and
a second indication, to indicate that the utility meter is in the second state of connectivity, in which the that a neighbor node has been acquired.

9. The network interface device of claim 1, wherein
the plurality of different states of connectivity include a first state of connectivity in which the utility meter has acquired a neighbor node, and a second state of connectivity in which a route has been established from the utility meter to an access point; and
the indicator dispoperates to display
a first indication, to indicate that the utility meter is in the first state of connectivity in which a neighbor node has been acquired; and
a second indication, to indicate that the utility meter is in the second state of connectivity, in which the route from the utility meter to the access point has been established.

10. The network interface device of claim 1, wherein
the plurality of different states of connectivity include a first state of connectivity in which the utility meter is acquiring a neighbor node, and a second state of connectivity in which a route has been established from the utility meter to an access point; and
the indicator operates to display
a first indication, to indicate that the utility meter is in the first state of connectivity in which the utility meter is acquiring a neighbor node; and
a second indication, to indicate that the utility meter is in the second state of connectivity in which the route from the utility meter to an access point has been established.

11. A communications interface that connects a utility meter to a wireless network, comprising:
a transceiver for transmitting and receiving data via the wireless network;
a controller that causes said transceiver to transmit data, and processes data received by the transceiver, to establish a connection to a node on the wireless network by progressing through a plurality of different states of connectivity until establishing the utility meter as a functioning node in the network; and
a light-emitting device that is controlled by said controller to operate in a plurality of different modes that respectively correspond to different stages of connectivity to the wireless network as the utility meter progresses through the plurality of different states of connectivity.

12. The communications interface of claim 11, wherein the light-emitting device comprises a single-color LED.

13. The communications interface of claim 12, wherein said different modes respectively comprise different patterns of ON and OFF states of the LED.

14. The communications interface of claim 11, wherein the light-emitting device comprises a tri-color LED.

15. The communications interface of claim 14, wherein at least some of said different modes respectively comprise different color emissions of the LED.

16. The communications interface of claim 15, wherein at least two of the modes are distinguished by different patterns of ON and OFF states for a given color of the LED.

17. The communications interface of claim 11, comprising a network interface card, and wherein the LED is positioned on an outer edge of the card.

18. The communications interface of claim 11, wherein
the plurality of different states of connectivity include a first state of connectivity in which the utility meter is acquiring a neighbor node, and a second state of connectivity in which the neighbor node has been acquired; and
the modes comprise
a first indication, to indicate that the utility meter is in the first state of connectivity, of acquiring a neighbor node; and
a second indication, to indicate that the utility meter is in the second state of connectivity, in which the neighbor node has been acquired.

19. The communications interface of claim 11, wherein
the plurality of different states of connectivity include a first state of connectivity in which the utility meter has acquired a neighbor node, and a second state of connectivity in which a route has been established from the utility meter to an access point; and
the modes comprise
a first indication, to indicate that the utility meter is in the first state of connectivity in which a neighbor node has been acquired; and
a second indication, to indicate that the utility meter is in the second state of connectivity, in which the route from the utility meter to the access point has been established.

20. The communications interface of claim 11, wherein
the plurality of different states of connectivity include a first state of connectivity in which the utility meter is acquiring a neighbor node, and a second state of connectivity in which a route has been established from the utility meter to an access point; and
the modes comprise
a first indication, to indicate that the utility meter is in the first state of connectivity in which the utility meter is acquiring a neighbor node; and
a second indication, to indicate that the utility meter is in the second state of connectivity in which the route from the utility meter to an access point has been established.

21. The communications interface of claim 11, wherein
the plurality of different states of connectivity include a first state of connectivity in which the utility meter is acquiring a neighbor node, a second state in which the neighbor node has been acquired, and a third state in which a route from the utility meter to a network access point has been established; and
the modes comprise
a first indication, to indicate that the utility meter is in the first state of connectivity, of acquiring a neighbor node;
a second indication, to indicate that the utility node is in the second state of connectivity, in which the neighbor node has been acquired; and
a third indication, to indicate that the utility meter is in the third state of connectivity, in which the route from the utility meter to the access point has been established.

22. A network interface device, comprising
a transceiver capable of connecting a utility meter to a wireless network by progressing through a plurality of different states of connectivity until establishing the utility meter as a functioning node in the network; and an indicator that operates to visually display an indicator of each of the plurality of different states of connectivity between the utility meter and the wireless network as the utility meter progresses through the plurality of different states of connectivity, wherein the plurality of different states of connectivity include a state of the utility meter, as a node, acquiring a neighbor node and a state of establishing a route to at least one access point.

23. A communications interface that connects a utility meter to a wireless network, comprising:

a transceiver for transmitting and receiving data via the wireless network;

a controller that causes said transceiver to transmit data, and processes data received by the transceiver, to establish a connection to a node on the wireless network by progressing through a plurality of different states of connectivity until establishing the utility meter as a functioning node in the network; and a light-emitting device that is controlled by said controller to operate in a plurality of different modes that respectively correspond to different stages of connectivity to the wireless network as the utility meter progresses through the plurality of different states of connectivity, wherein the plurality of different states of connectivity include a state of the utility meter, as a node, acquiring a neighbor node and a state of establishing a route to at least one access point.

\* \* \* \* \*